Patented Feb. 24, 1925.

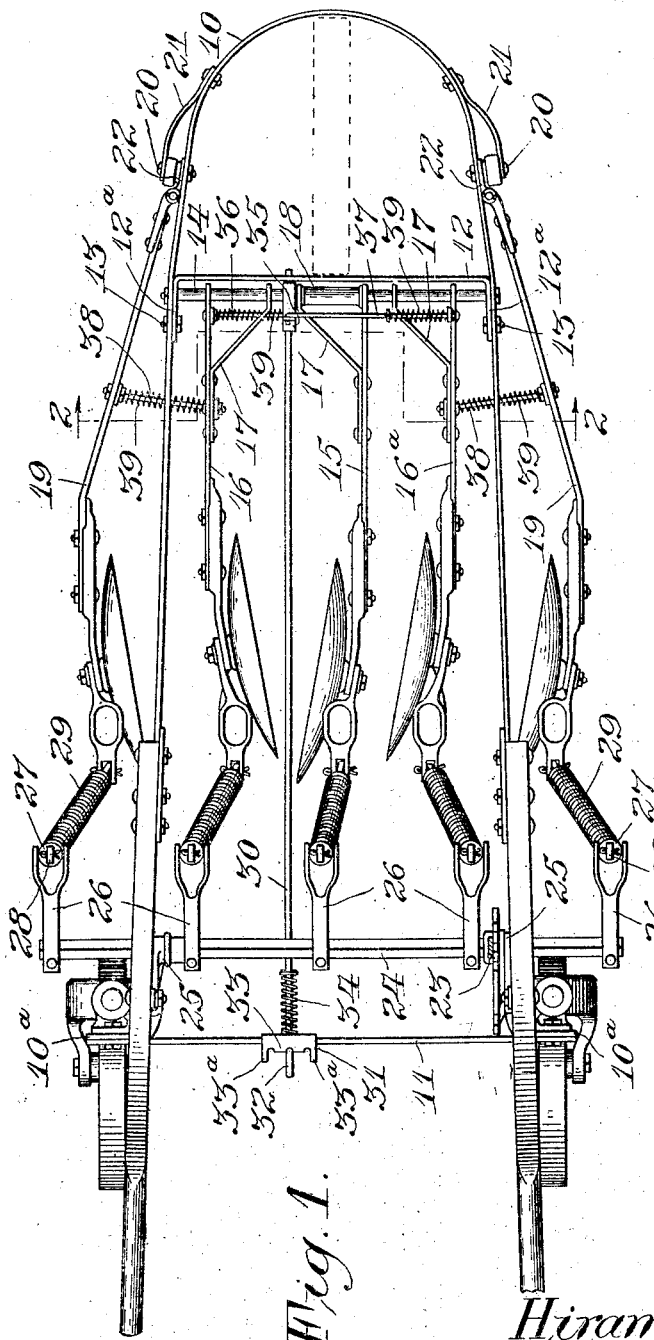
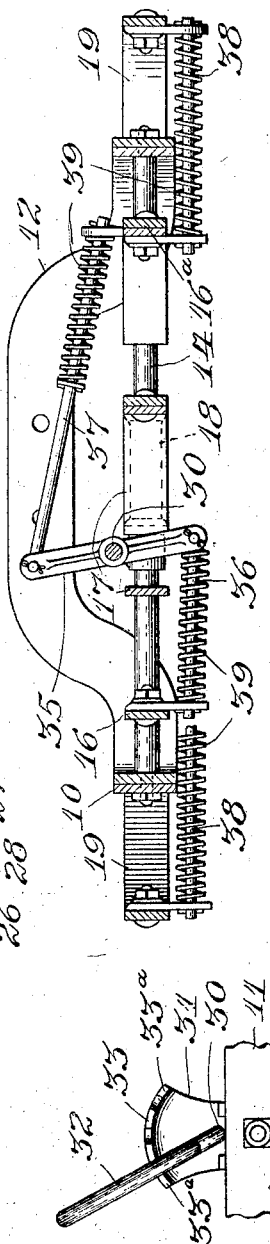
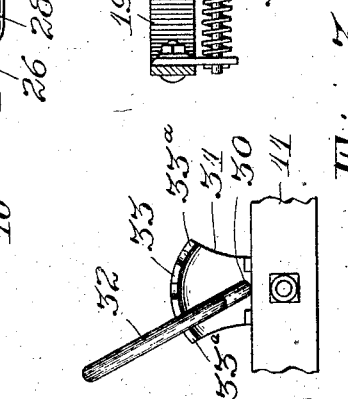

1,527,803

UNITED STATES PATENT OFFICE.

HIRAM H. HUNTINGTON, OF RICHMOND, INDIANA, ASSIGNOR TO INTERNATIONAL HARVESTER COMPANY, OF CHICAGO, ILLINOIS, A CORPORATION OF NEW JERSEY.

SPACING DEVICE FOR FURROW OPENERS.

Application filed May 26, 1922. Serial No. 563,985.

*To all whom it may concern:*

Be it known that I, HIRAM H. HUNTINGTON, a citizen of the United States, residing at Richmond, in the county of Wayne and State of Indiana, have invented certain new and useful Improvements in Spacing Devices for Furrow Openers, of which the following is a full, clear, and exact specification.

This invention is directed to improvement in adjusting mechanism for the drag bars of grain drills and like implements where it is desirable to vary the distances between a series of furrow forming tools while maintaining uniform spacing between them at all adjustments and has more particularly to do with combination of such mechanism with the drag bars and openers on a hand guided or walking grain drill employing, in the present instance, five single disk openers. Accordingly, the invention resides in the organization and details of construction, or their equivalents, hereinafter described and claimed.

Referring to the drawing—

Fig. 1 is a plan view of a drill frame and drag bars including the novel mechanism;

Fig. 2 is a transverse sectional view on line 2—2 of Fig. 1; and

Fig. 3 is an enlarged detail view of the latch.

The drill to which the invention is applied in this instance comprises a main frame which is preferably formed of a curved or U-shaped bar 10, the limbs or branches of which extend rearwardly and outwardly at their ends as at 10ª, a rear cross bar 11 is secured to the bent ends 10ª and a front cross bar 12 connects the branches at the base of the arched part of the frame bar 10. The cross bar 12 is preferably formed with bent ends 12ª which are secured to the bar 10 by fastening elements 13 and by a cylindrical rod 14 which extends across the frame parallel with bar 12 and has its ends passed through and secured in the ends 12ª and bar 10 in the manner shown in Fig. 1. The rod 14 serves as a bearing or support for a central drag bar 15 and two intermediate drag bars 16, 16ª to the left and right af the central drag bar to which the openers, in this case single disks, are secured. Each of these drag bars is provided with a lateral branch 17 at its forward end engaging the rod 14 to brace the drag bar against lateral pivotal movement and the central drag bar 15 is fixed against lateral sliding movement on rod 14 by a spool or similar device 18 secured to rod 14 between the end of bar 15 and its branch 17, while the intermediate drag bars 16 are left free to slide on rod 14. On each side of the frame, there is mounted an outer drag bar 19. These drag bars have their forward ends pivoted to the frame for both vertical and horizontal movement through the medium of pivot bolts 20 which extend laterally from the outer side of the branches of frame bar 10 at points forward of the rod 14 and have their outer ends braced by brackets 21 secured at their forward ends to the arch of the bar 10, the bolts 20 serving as horizontal pivots for hinge plates 22 to which the drag bars 19 are pivoted for lateral movement. There is thus provided one central, two intermediate and two outer drag bars each of which carries a disk opener and seed boot and all of which can be raised and lowered in unison by means of a lever 23 secured to a rock shaft 24 mounted in suitable supports secured to the frame. The lever 23 is locked in adjusted position by the usual pawl and rack mechanism and the rock shaft 24 is provided with a series of spaced lifting arms 26 which are clamped thereto and have their outer ends formed as forks in which are pivoted pressure plates 27 through which the lifting links or bars 28 freely pass. The links 28 are pivotally connected to the seed boots and support coil springs 29 which bear at their upper ends on the plates 27 and at their lower ends on a stop formed on the links near their point of connection to the seed boots. The links 28 are provided with means such as a series of perforations in either their upper or lower ends in which a cotter pin may be adjustably positioned, thereby varying the pressure applied to the springs 29 and through them to the disk openers when they are forced into the ground.

As a novel means for quickly and accurately varying the spacing of the disk openers, there is provided a rock shaft or operating rod 30 which has its forward end journaled in cross bar 12 and its rear end journaled in a bracket 31 on rear cross bar 11. The rear end of rock shaft 30 is bent upwardly to form an operating handle 32, the front part of which engages the notches of a rack 33 on bracket 31 in which it is yieldingly held by a spring 34 bearing at one end on the inner side of bar 11 and at its other end on a stop collar secured on shaft 30. In the present instance, the rack 33 is provided with a central notch and two lateral notches as shown in Fig. 1 and the ends of the rack are formed with stops 33ª limiting movement of handle 32. On the front end of rock shaft 30 a cross head 35 is fixed in parallel position with handle 32 and to the respective ends of this cross piece there are pivoted links 36 and 37. The link 36 connects with the intermediate drag bar 16 and the link 37 with the intermediate drag bar 16ª and, at a predetermined point in the length of the outer drag bars 19, similar links 38 connect them with the intermediate drag bars, the points of connection of links 38 with the outer drag bars being so located that lateral movement of the intermediate bars will be doubled at the free end of the outer drag bars, thus giving the outer openers twice the movement imparted to the intermediate openers. The links 36, 37, 38 are slidably held in the respective drag bars at their outer ends and compression springs 39 are mounted on them to bear against the bars and yieldingly retain them in the spaced position at which they may be set.

With the arrangement just described, swinging of handle 32 to the notch on the right will rock cross head 35 causing it to push the intermediate drag bars outwardly on rod 14, they in turn swinging the outer drag bars on their hinges and giving the outer disk openers twice the movement given the intermediate ones. Consequently, turning of handle 32 to either the right or left notches causes the intermediate drag bars with their disk openers to move outwardly or inwardly on rod 14 a definite distance, for example, one inch, and the outer or wing disks on outer bars 19 will be moved twice as much or two inches, thus maintaining an even spacing between disks at all adjustments which, with the particular arrangement just described, will be either seven, six or eight inches between disks according to whether the handle 32 is in the central, left, or right notch on bracket 31.

I have therefore provided a simple and efficient space adjusting device for grain drills of the class described and one exemplifying a construction with which uniform spacing is maintained at all adjustments and one with which yielding pressure is applied to the drag bars thereby enabling the spacing to be increased while the openers are in the soil as the handle 32 can then be turned against the pressure of the springs alone and without positively shifting the openers by main force, they quickly attaining the spacing set through outward pressure of the springs on the drag bars and thrust of the soil on the disks as they travel in the ground.

Having thus described the preferred embodiment of my invention, what I claim as new and desire to secure by Letters Patent is:

In an implement of the class described, a frame comprising side bars having a transverse rod connecting them, central and intermediate drag bars attached to said rod, the intermediate bars being slidable laterally on the rod and the central bar being fixed, an outer drag bar pivoted to each side bar of the frame on a vertical pivot, links yieldingly connecting each intermediate bar with the outer bars at predetermined points in the length of the latter, and a longitudinally extending rock shaft journaled on the frame and provided with oppositely extending arms each of which is connected to one of the intermediate bars by a yielding spring connection.

In testimony whereof I affix my signature.

HIRAM H. X HUNTINGTON.
his mark

Witness to signature of Hiram H. Huntington:
OWEN L. LOOFBOURROW.